United States Patent
Moriwaki et al.

(10) Patent No.: US 8,743,095 B2
(45) Date of Patent: Jun. 3, 2014

(54) ELECTRONIC APPARATUS AND DISPLAY PANEL

(75) Inventors: Hiroyuki Moriwaki, Osaka (JP);
Mayuko Sakamoto, Osaka (JP);
Kenichi Ishii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 240 days.

(21) Appl. No.: 13/395,223

(22) PCT Filed: May 25, 2010

(86) PCT No.: PCT/JP2010/058832
§ 371 (c)(1),
(2), (4) Date: Mar. 9, 2012

(87) PCT Pub. No.: WO2011/040087
PCT Pub. Date: Apr. 7, 2011

(65) Prior Publication Data
US 2012/0169681 A1 Jul. 5, 2012

(30) Foreign Application Priority Data
Sep. 30, 2009 (JP) ................................. 2009-227532

(51) Int. Cl.
*G09G 3/36* (2006.01)
*G02F 1/1345* (2006.01)

(52) U.S. Cl.
USPC ............... 345/204; 345/87; 345/98; 349/139

(58) Field of Classification Search
CPC ... G09G 3/36; G09G 3/3611; G09G 2300/04; G02F 1/1345
See application file for complete search history.

(56) References Cited

U.S. PATENT DOCUMENTS

| | | | |
|---|---|---|---|
| 6,580,411 B1 | 6/2003 | Kubota et al. | |
| 7,196,699 B1 | 3/2007 | Kubota et al. | |
| RE43,401 E * | 5/2012 | Miyake et al. | 326/88 |
| 8,237,162 B2 * | 8/2012 | Arai | 257/59 |
| 2001/0012076 A1 * | 8/2001 | Ohkawara et al. | 349/38 |
| 2001/0052898 A1 * | 12/2001 | Osame et al. | 345/211 |
| 2002/0067322 A1 * | 6/2002 | Yanagawa et al. | 345/87 |
| 2003/0048261 A1 * | 3/2003 | Yamamoto et al. | 345/173 |

(Continued)

FOREIGN PATENT DOCUMENTS

| | | |
|---|---|---|
| JP | 10-268348 A | 10/1998 |
| JP | 2000-187994 A | 7/2000 |
| JP | 2006-18165 A | 1/2006 |
| JP | 2007-264468 A | 10/2007 |

OTHER PUBLICATIONS

Official Communication issued in International Patent Application No. PCT/JP2010/058832, mailed on Aug. 31, 2010.

*Primary Examiner* — Joe H Cheng
(74) *Attorney, Agent, or Firm* — Keating & Bennett, LLP

(57) ABSTRACT

A display device as an electronic apparatus in accordance with the present invention includes a clock signal wiring (104) for connecting to a source driver circuit; a power supply wiring (105) formed at a position where the power supply wiring (105) does not overlap with a projection plane of the clock signal wiring (104), so as to sandwich at least an insulating layer with a layer in which the clock signal wiring (104) is formed; and a capacitive electrode (109) electrically connected to the clock signal wiring (104). The capacitive electrode (109) is formed so as to overlap at least partially with a projection plane of the power supply wiring (105). A capacitance (301) is formed between the capacitive electrode (109) and the power supply wiring (105).

14 Claims, 10 Drawing Sheets

(56) References Cited

U.S. PATENT DOCUMENTS

| | | |
|---|---|---|
| 2004/0159794 A1* | 8/2004 | Morii et al. .............. 250/370.11 |
| 2004/0178977 A1* | 9/2004 | Nakayoshi et al. ............. 345/87 |
| 2006/0002045 A1 | 1/2006 | Kobashi |
| 2011/0199564 A1* | 8/2011 | Moriwaki ..................... 349/122 |
| 2011/0199738 A1* | 8/2011 | Moriwaki ..................... 361/748 |
| 2012/0081344 A1* | 4/2012 | Moriwaki ..................... 345/208 |
| 2013/0100104 A1* | 4/2013 | Sagawa et al. ................. 345/211 |
| 2013/0222219 A1* | 8/2013 | Saitoh et al. .................... 345/89 |

* cited by examiner

ELECTRONIC APPARATUS AND DISPLAY PANEL

TECHNICAL FIELD

The present invention relates to electronic apparatus having an integrated electronic circuit, and, in particular, to an electronic apparatus including a mechanism for modulating a waveform of an input or output signal to or from an electronic circuit.

BACKGROUND ART

Examples of the electronic apparatus including a mechanism for modulating a waveform of an input or output signal to or from an electronic circuit encompass a display device such as a liquid crystal display device.

Generally, a display device includes, as illustrated in FIG. 9, a display panel 1001 and a control substrate 1002 for driving and controlling the display panel 1001. The display panel 1001 has a so-called driver monolithic structure in which, on a glass substrate 1101 that is a transparent insulating substrate, a pixel region 1102, a gate driver circuit 1103, a clock signal wiring 1104, and a power supply wiring 1105 are integrally formed (see, for example, Patent Literature 1).

The display device further includes source driver circuits 1107 for driving a source signal wiring (not illustrated) of the display panel 1001, the source driver circuits 1107 being provided separately from the display panel 1001.

The control substrate 1002 is connected to the source driver circuits 1107 to drive and is configured to control the source driver circuits 1107 and also the gate driver circuit 1103.

Accordingly, a clock signal is supplied to the clock signal wiring 1104 from the control substrate 1002 via the source driver circuit 1107. Analogously, power is supplied to the power supply wiring 1005 from the control substrate 1002 via the source driver circuit 1007.

In order to, for example, modulate a waveform of an input or output signal to evaluate the influence of the signal whose waveform is modulated, one considerable option is that a signal generator 1003 for supplying the control substrate 1002 with a signal whose waveform has been modulated is used to modulate a waveform of an input or output signal to or from the display panel 1001 of the display device, as illustrated in FIG. 9. Alternatively, another considerable option is that a capacitance for modulating a waveform of an input signal or output signal is additionally provided to the control substrate 1002. FIG. 10(a) illustrates an equivalent circuit in a case where the signal generator 1003 is used, and FIG. 10(b) illustrates an equivalent circuit in a case where a capacitance 1004 is additionally provided to the control substrate 1002.

CITATION LIST

Patent Literature 1
Japanese Patent Application Publication, Tokukai No. 2000-187994 A (Publication date: Jul. 4, 2000)

SUMMARY OF INVENTION

Technical Problem

However, the conventional approach as illustrated in FIG. 10(a), in which the control substrate 1002 is provided with the separate signal generator 1003 for modulating a waveform of an input or output signal to or from the display panel 1001, requires preparing the signal generator 1003 which is to be added. This causes an increase in manufacturing cost disadvantageously. The other conventional approach as illustrated in FIG. 10(b), in which the capacitance 1004 is additionally provided to the control substrate 1002, requires changing design of the control substrate 1002 and preparing a member needed as a result of the change of design. This causes an increase in development cost disadvantageously.

That is, in conventional electronic apparatus including a mechanism for modulating a waveform of an input or output signal to or from an electronic circuit, modulating a waveform of the input or output signal to or from the integrated electronic circuit poses problems in increasing manufacturing and development costs for a signal generator to be separately prepared, or the change of design of a control substrate and the preparation of a member needed as a result of the change of design.

The present invention has been accomplished in view of the problems mentioned above, and one object of the present invention is to provide an electronic apparatus in which a waveform of an input or output signal to or from an electronic circuit can be modulated without (i) providing a device such as a signal generator and (ii) changing design of a control substrate and preparing a member needed as a result of the change of design, i.e., an electronic apparatus attained with reduced development and manufacturing costs.

Solution to Problem

In order to attain the above mentioned object, an electronic apparatus in accordance with the present invention is an electronic apparatus having an integrated electronic circuit, including: an input/output signal wiring for inputting or outputting a signal to or from the electronic circuit; a conductive film formed at a position where the conductive film does not overlap with a projection plane of the input/output signal wiring, so as to sandwich at least an insulating layer with a layer in which the input/output signal wiring is formed; and a capacitive electrode electrically connected to the input/output signal wiring, the capacitive electrode being formed so as to overlap at least partially with a projection plane of the conductive film.

According to the configuration in which the capacitive electrode, which is electrically connected to the input/output signal wiring, is formed so as to overlap at least partially with the projection plane of the conductive film via the insulating layer, a capacitance is formed between the capacitive electrode and the conductive film. The capacitance formed between the capacitive electrode and the conductive film will influence an input or output signal passing through the input/output signal wiring because the capacitive electrode is electrically connected to the input/output signal wiring. That is, it is possible to modulate a waveform of an input or output signal passing through the input/output signal wiring by means of the capacitance.

No additional capacitance for modulating a waveform of an input or output signal is thus needed to be additionally provided to a control substrate for driving and controlling the electronic circuit. This eliminates the need to remodel or to change design of the control substrate in association with the addition of a capacitance. This further eliminates the need to provide a separate signal generator for modulating a waveform of an input or output signal. Consequently, it is possible to reduce development and manufacturing costs of the electronic apparatus.

Further, the dimension of the capacitance is determined in accordance with the area in which the capacitive electrode and the projection plane of the conductive film overlap with each other. It is therefore preferable that the capacitive electrode and the projection plane of the conductive film overlap completely with each other.

One aspect of the present invention is such that the capacitive electrode is formed so that an entire electrode surface of the capacitive electrode is located within the projection plane of the conductive film.

According to the configuration in which the entire electrode surface of the capacitive electrode is formed within the projection plane of the conductive film, the electrode surface of the capacitive electrode is completely covered with the projection plane of the conductive film. Accordingly, it is possible to change a capacitance value of the capacitance formed between the capacitive electrode and the conductive film simply by changing the area of the electrode surface of the capacitive electrode. In this way, a capacitance value of the capacitance can be adjusted easily, so that, in a case where a waveform of an input or output signal is modulated, an easy adjustment of an amount of modulation is possible.

Further, in a case where an electronic circuit is a display panel such as a liquid crystal display panel, the configuration, in which the electrode surface of the capacitive electrode is completely covered with the projection plane of the conductive film, makes it possible to add the capacitance without increasing the area of a frame region around the display panel.

One aspect of the present invention is such that the capacitive electrode is formed in a same layer as the input/output signal wiring.

According to the configuration in which the capacitive electrode is formed in the same layer as the input/output signal wiring, it is possible to form the capacitive electrode in the same step for producing the input/output signal wiring, simply by slightly changing a pattern for producing the input/output signal wiring. In other words, it is possible to easily produce the capacitive electrode for modulating a waveform of an input or output signal passing through the input/output signal wiring, simply by slightly changing a pattern for producing the input/output signal wiring.

An existing production process can thus be used as a production process needed for the modulation of a waveform of an input or output signal passing through the input/output signal wiring. This can prevent manufacturing and development costs of the electronic apparatus from increasing.

One aspect of the present invention is such that the capacitive electrode is composed of a plurality of divided capacitive electrodes insulated from each other, each of the divided capacitive electrodes constituting the same capacitive electrode being connected to the same input/output signal wiring via each connecting wiring.

According to the configuration, a capacitance is independently formed between each of the divided capacitive electrodes and the conductive film, since the plurality of divided capacitive electrodes constituting the capacitive electrode are insulated from each other. The capacitances thus formed are referred to as divided capacitances. Each of the divided capacitive electrodes is connected to the same input/output signal wiring via each connecting wiring, and therefore, a capacitance used to modulate a waveform of an input or output signal passing through the input/output signal wiring is the sum total of the divided capacitances formed between each of the divided capacitive electrode and the conductive film.

Accordingly, it is possible to adjust a capacitance value of the capacitance which is used to modulate a waveform of an input or output signal passing through the input/output signal wiring, by cutting any one of the connecting wirings which electrically connect the divided capacitive electrodes to the input/output signal wiring.

One aspect of the present invention is such that the conductive film is a power supply wiring for supplying the electronic circuit with power.

According to the configuration, a capacitance value of the capacitance can be stabilized since the conductive film, which serves as one of electrodes for forming the capacitance, is a power supply wiring.

It is thus possible to surely obtain a capacitance having a capacitance value desired by a manufacturer of the display device.

One aspect of the present invention is such that the conductive film is a part of a light shielding film formed in the electronic circuit.

According to the configuration, the conductive film can be formed in the same step for producing the light shielding film since the conductive film is a part of the light shielding film formed in the electronic circuit. Therefore, no separate process for producing the conductive film is necessary. This can thus prevent the cost for manufacturing the capacitance from increasing.

One aspect of the present invention is such that the light shielding film is connected to the power supply wiring for supplying the electronic circuit with power.

According to the configuration, a capacitance value of the capacitance can be stabilized since the light shielding film, which serves as one of the electrodes for forming the capacitance, is connected to the power supply wiring.

It is thus possible to surely obtain a capacitance having a capacitance value desired by a manufacturer of the display device.

One aspect of the present invention is such that the conductive film is a part of a transparent conductive film for forming pixels of the electronic circuit.

According to the configuration, the conductive film can be produced in the same step for producing the transparent conductive film since the conductive film is a part of a transparent conductive film for forming pixels of the electronic circuit. Therefore, no separate process for producing the conductive film is needed. This can prevent the cost for manufacturing the capacitance from increasing.

One aspect of the present invention is such that the transparent conductive film is connected to the power supply wiring for supplying the electronic circuit with power.

According to the configuration, a capacitance value of the capacitance can be stabilized since the transparent conductive film, which serves as one of the electrodes for forming the capacitance, is connected to the power supply wiring.

It is thus possible to surely obtain a capacitance having a capacitance value desired by a manufacturer of the display device.

One aspect of the present invention is such that the transparent conductive film is provided on a liquid crystal display panel including a pixel electrode substrate and a counter substrate facing the pixel electrode substrate, the transparent conductive film being provided on the pixel electrode substrate and being electrically connected to a counter electrode provided on the counter substrate via a conductive member.

According to the configuration, a capacitance value of the capacitance can be stabilized since the transparent conductive film, which serves as one of electrodes for forming the capacitance, is electrically connected to the counter electrode provided on the counter substrate facing the pixel electrode substrate, via a conductive member.

It is thus possible to surely obtain a capacitance having a capacitance value desired by a manufacturer of the display device.

One aspect of the present invention is such that the input/output signal wiring is a clock signal wiring for supplying the electronic circuit with a clock.

According to the configuration, it is possible to evaluate the operational performance of a driver since a waveform of a clock signal passing through the clock signal wiring can be modulated.

One aspect of the present invention is such that the input/output signal wiring is an output signal wiring for outputting an output signal from the electronic circuit to the liquid crystal display panel.

According to the configuration, by which a waveform of an output signal passing through the output signal wiring can be modulated, it is possible to observe how a display condition of the liquid crystal display panel is varied. That is, it is possible to evaluate a display condition of the liquid crystal display panel.

An electronic apparatus in accordance with the present invention is an electronic apparatus having an integrated electronic circuit, including: an input/output signal wiring for inputting or outputting a signal to or from the electronic circuit; a conductive film formed at a position where the conductive film does not overlap with a projection plane of the input/output signal wiring, so as to sandwich at least an insulating layer with a layer in which the input/output signal wiring is formed; and a capacitive electrode formed so as to sandwich the insulating layer with the conductive film, the capacitive electrode being composed of a plurality of divided capacitive electrodes insulated from each other, each of the plurality of divided capacitive electrodes being connected, via the input/output signal wiring and the insulating layer, to each connecting wiring formed in a different layer, the each connecting wiring being formed so that a part of a projection plane of the connecting wiring overlaps with the projection plane of the input/output signal wiring.

In an initial condition, the connecting wirings constituting the capacitive electrode in accordance with the configuration are not connected to the input/output signal wiring, so that an input or output signal, whose waveform is not modulated, can be passed through the input/output signal wiring.

When a modulation of a waveform is required, the configuration capable of performing the modulation can be prepared by welding at least one of the connecting wirings to the input/output signal wiring in such a manner that a part of the connecting wiring(s), which part is on the input/output signal wiring-side, is welded and electrically connected to the input/output signal wiring, thereby allowing a capacitance to be formed. In this case, a capacitance value of the capacitance can be adjusted, by adjusting the number of the connecting wirings to be welded.

Advantageous Effects of Invention

The electronic apparatus in accordance with the present invention is an electronic apparatus having an integrated electronic circuit, including: an input/output signal wiring for inputting or outputting a signal to or from the electronic circuit; a conductive film formed at a position where the conductive film does not overlap with a projection plane of the input/output signal wiring, so as to sandwich at least an insulating layer with a layer in which the input/output signal wiring is formed; and a capacitive electrode electrically connected to the input/output signal wiring, the capacitive electrode being formed so as to overlap at least partially with a projection plane of the conductive film.

DESCRIPTION OF EMBODIMENTS

Embodiment 1

The following description will discuss Embodiment 1 in accordance with the present invention. Note that, Embodiment 1 and other embodiments will be described on the premise that an electronic apparatus in accordance with the present invention, in which an electronic circuit is integrated, is used as a display device.

Figure 1:
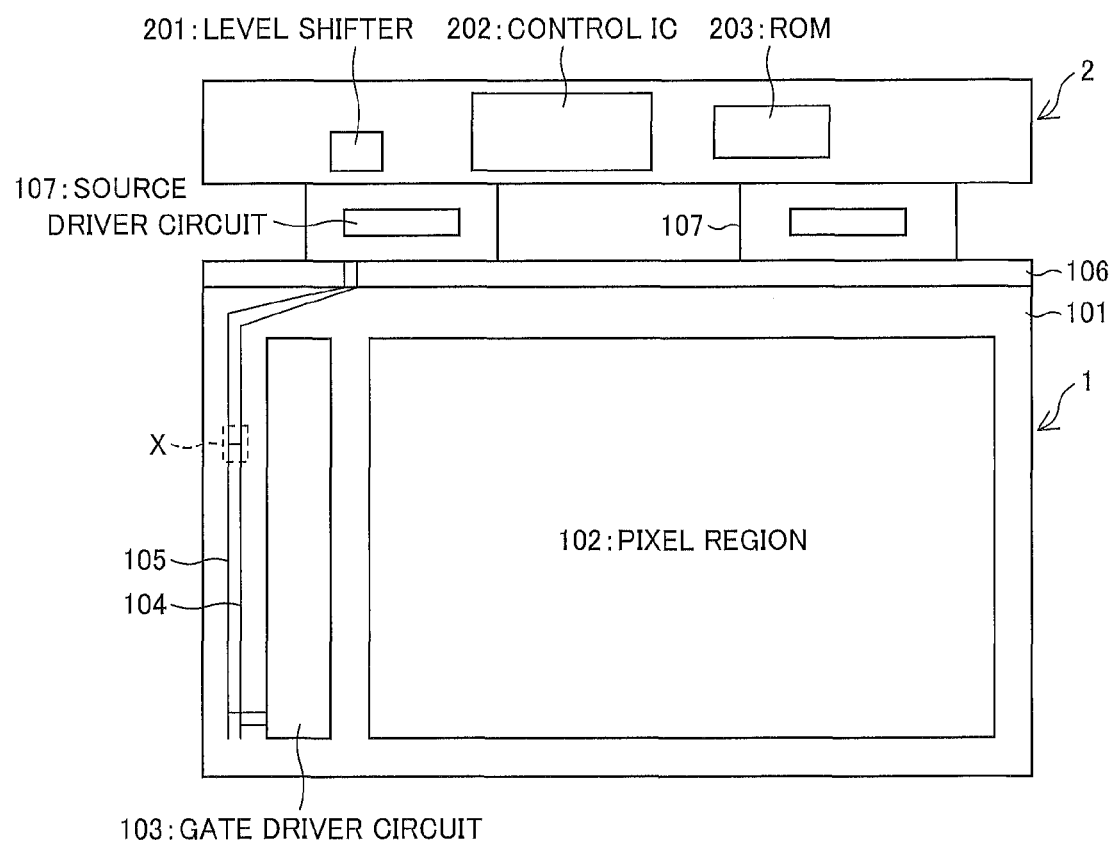
FIG. 1 is a block diagram illustrating a schematic configuration of a display device according to an embodiment of the present invention.

The display device in accordance with Embodiment 1 includes, as illustrated in FIG. 1, a display panel 1, and a control substrate (electronic circuit: control substrate) 2 for driving and controlling the display panel 1.

The display panel 1 is, for example, a liquid crystal display panel. The display panel 1 has a configuration in which, on a transparent insulating substrate 101 such as a glass substrate, a pixel region 102, a gate driver circuit (electronic circuit) 103, a clock signal wiring (input/output signal wiring) 104, a power supply wiring (conductive film) 105, and a connecting terminal 106 are integrally formed, and source driver circuits 107 are formed as separate members connected to the connecting terminal 106.

The pixel region 102 includes, although not illustrated, pixel electrodes arranged in matrix, a switching element for driving the pixel electrodes, and a source signal wiring and a gate signal wiring both of which are connected to the switching element.

The gate signal wiring is connected to the gate driver circuit 103. The source signal wiring is connected to the source driver circuit 107 via the connecting terminal 106.

The clock signal wiring 104 and the power supply wiring 105 are connected to the gate driver circuit 103.

The clock signal wiring 104 and the power supply wiring 105 are also connected to the source driver circuit 107 via the connecting terminal 106 formed on the insulating substrate 101.

Both a clock signal supplied through the clock signal wiring 104 and power supplied through the power supply wiring 105 are supplied from the control substrate 2 to the gate driver circuit 103 via the source driver circuit (electronic circuit) 107.

The control substrate 2 includes a level shifter 201, a control IC 202, and a ROM 203. The control IC 202 controls the driving of the source driver circuit 107 and of the gate driver circuit 103 by reading out a program stored in the ROM 203 and by causing the level shifter 201 to boost a signal in accordance with the program thus read out.

The following description will discuss a mechanism for modulating a waveform of an input or output signal to or from the display panel 1, which mechanism is a feature of the present invention.

Figure 2A:
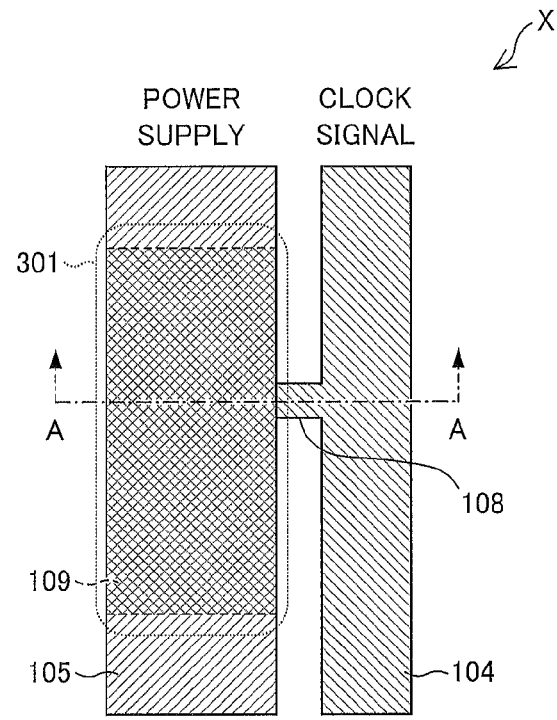
FIG. 2(a) is an enlarged view of a relevant part X illustrated in FIG. 1.
Figure 2B:
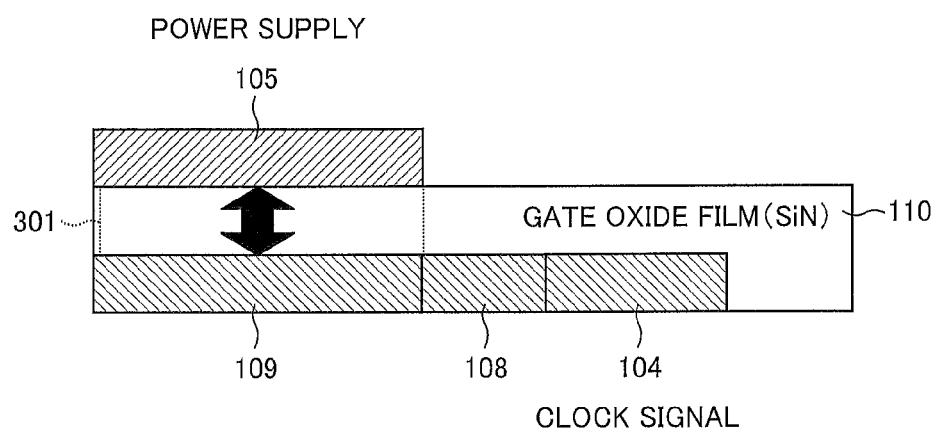
FIG. 2(b) is a cross-sectional view taken along the line AA of FIG. 2(a).

A clock signal passing through the clock signal wiring 104 is described as an example of the input or output signal with reference to FIGS. 2(a) and 2(b).

FIG. 2(a) is an enlarged plan view illustrating the clock signal wiring 104 and the power supply wiring 105 in a relevant part X in FIG. 1. FIG. 2(b) is a cross-sectional view taken along the line AA of FIG. 2(a).

As illustrated in FIG. 2(a), the clock signal wiring 104 is connected, via the connecting wiring 108, to the capacitive electrode 109 formed on the power supply wiring 105-side.

As illustrated in FIG. 2(b), the connecting wiring 108 and the capacitive electrode 109 are provided in the same layer as the clock signal wiring 104. On the clock signal wiring 104, the connecting wiring 108, and the capacitive electrode 109, an insulating layer is formed. As the insulating layer, a gate oxide film (SiN) 110 is provided, because the clock signal wiring 104 is provided in the same layer as the gate signal wiring formed in the pixel region 102.

Further, the power supply wiring 105 is formed on the gate oxide film 110. The power supply wiring 105 is provided in the same layer as the source signal wiring formed in the pixel region 102, a power VSS, and a power VDD.

The display panel 1 includes: the clock signal wiring 104, which is an input/output signal wiring, connected to the gate driver circuit 103 and the source driver circuit 107; the power supply wiring 105, which is a conductive film, formed at a position where the conductive film does not overlap with a projection plane of the clock signal wiring 104, so as to sandwich at least the gate oxide film 110 with a layer in which the clock signal wiring 104 is formed; and the capacitive electrode 109 electrically connected to the clock signal wiring 104 via the connecting wiring 108.

The capacitive electrode 109 is provided at a position where an entire electrode surface of the capacitive electrode 109 overlaps with a projection plane of the power supply wiring 105 and thus forms a capacitance 301 between the capacitive electrode 109 and the power supply wiring 105. In this regard, it is preferable that the capacitive electrode 109 completely overlaps with the projection plane of the power supply wiring 105. However, the capacitance can be formed provided that the capacitive electrode 109 at least partially overlaps with the projection plane of the power supply wiring 105.

A capacitance value of the capacitance 301 can be stabilized since the power supply wiring 105 serves as one of electrodes for forming the capacitance 301. It is thus possible to surely obtain a capacitance 301 having a capacitance value desired by a manufacturer of the display device.

The capacitance value of the capacitance 301 is determined in accordance with (i) a distance between the power supply wiring 105 and the capacitive electrode 109, and (ii) an extent of the overlapping of the projection plane of the power supply wiring 105 and the capacitive electrode 109. Therefore, provided that the distance is constant, the larger the overlapping area is, the higher the capacitance value of the capacitance 301 will be.

Accordingly, in a case where the area of the projection plane of the power supply wiring 105 is larger than that of the electrode surface of the capacitive electrode 109, it is possible to adjust the capacitance value of the capacitance 301 by changing the area of the electrode surface of the capacitive electrode 109 so that the capacitive electrode 109 completely overlaps with the projection plane of the power supply wiring 105.

According to the display device having the configuration described above, the capacitive electrode 109 electrically connected to the clock signal wiring 104, which is the input/output signal wiring, is formed so as to overlap at least partially with the projection plane of the power supply wiring 105, which is the conductive film, via the gate oxide film 110. Consequently, the capacitance 301 is formed between the capacitive electrode 109 and the power supply wiring 105. The capacitance 301 formed between the capacitive electrode 109 and the power supply wiring 105 will influence an input signal or output signal passing through the clock signal wiring 104, since the capacitive electrode 109 is electrically connected to the clock signal wiring 104. In other words, it becomes possible to perform such modulation that a waveform of the clock signal passing through the clock signal wiring 104 is modulated by means of the capacitance 301.

No additional capacitance for modulating a waveform of the clock signal is thus required to be additionally provided to the control substrate 2 for driving and controlling the gate driver circuit 103 or the source driver circuit 107. This eliminates the need to remodel or to change design of the control substrate in association with the addition of a capacitance. This also eliminates the need to provide a separate signal generator for modulating a waveform of an input or output signal. It is thus possible to reduce development and manufacturing costs of the electronic apparatus.

Further, the dimension of the capacitance is determined in accordance with the overlapping area of the capacitive electrode 109 and the projection plane of the power supply wiring 105. It is thus preferable that the capacitive electrode 109 completely overlaps with the projection plane of the power supply wiring 105.

In other words, it is preferable that the area of the projection plane of the power supply wiring 105 is larger than that of the electrode surface of the capacitive electrode 109.

Accordingly, it is possible to change a capacitance value of the capacitance formed between the capacitive electrode 109 and the power supply wiring 105, simply by changing the area of the electrode surface of the capacitive electrode 109 provided that the electrode surface of the capacitive electrode 109 completely overlaps with the projection plane of the power supply wiring 105. In this way, a capacitance value of the capacitance can be adjusted easily, so that, in a case where a waveform of the clock signal is modulated, an easy adjustment of an amount of modulation is possible.

Such a configuration enables adding a capacitance without increasing the area of a frame region (including a region where wirings and drivers are formed) around the display panel 1, since the electrode surface of the capacitive electrode 109 is completely covered with the projection plane of the power supply wiring 105.

Furthermore, the capacitive electrode 109 is formed in the same layer as the clock signal wiring 104. It is thus possible to form the capacitive electrode 109 in the same step for producing the clock signal wiring 104, simply by slightly changing a pattern for producing the clock signal wiring 104. In other words, it is possible to easily produce the capacitive electrode 109 for modulating a waveform of a clock signal passing through the clock signal wiring 104, simply by slightly changing a pattern for producing the clock signal wiring 104.

An existing production process can thus be used as a production process needed for the modulation of a waveform of a clock signal passing through the clock signal wiring 104. This can prevent manufacturing and development costs of the electronic apparatus from increasing.

In the above-described process, the capacitance 301 is composed of one capacitive electrode 109, so that a capacitance value of the capacitance 301 is adjusted by changing the electrode area of the capacitive electrode 109. Note that a capacitance value of the capacitance can be adjusted in another way. The following will describe a case where a capacitive electrode is composed of a plurality of capacitive electrodes (hereinafter referred to as divided capacitive electrodes) and capacitances (hereinafter referred to as divided capacitances) are independently formed by each of the divided capacitive electrodes.

Figure 3A:
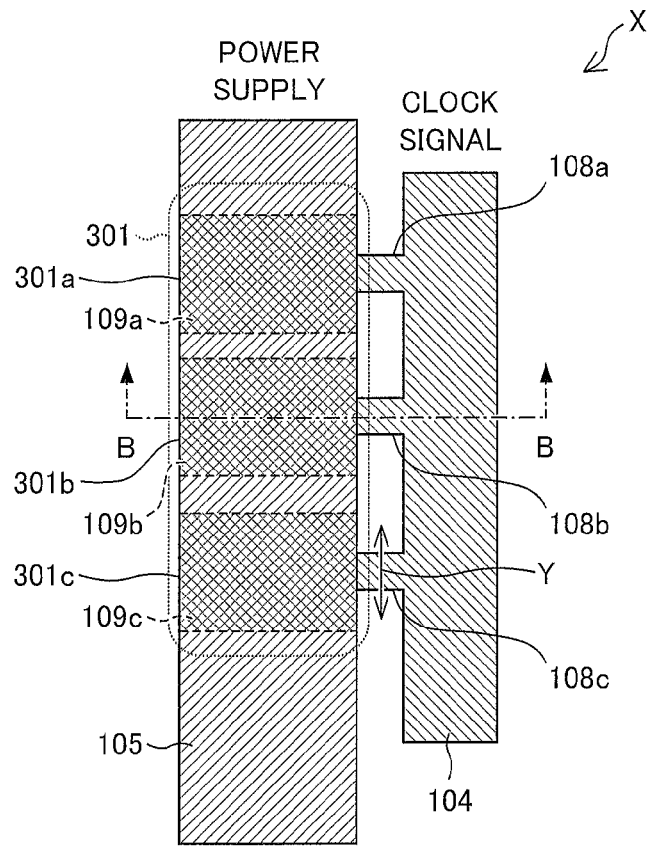
FIG. 3(a) is an enlarged view of the relevant part X in FIG. 1.
Figure 3B:
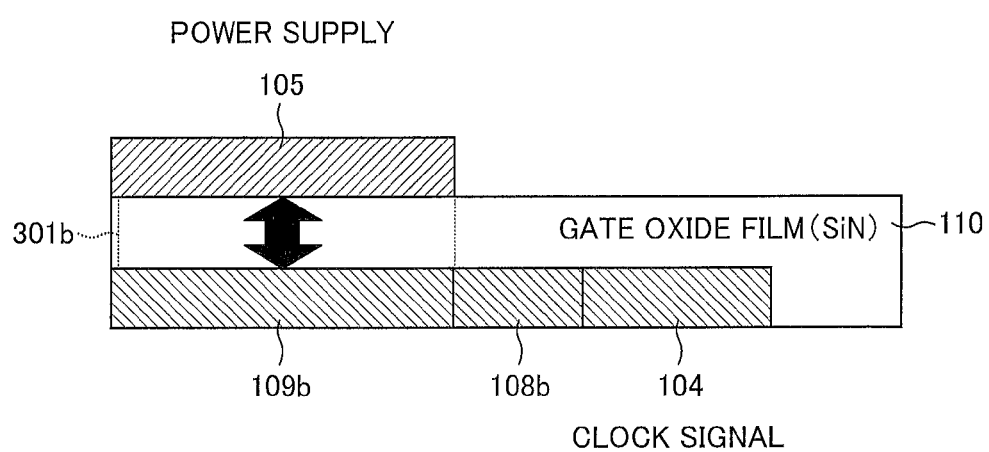
FIG. 3(b) is a cross-sectional view taken along the line BB of FIG. 3(a).

The following description will first discuss an example how a capacitance value of the capacitance 301 is adjusted by the divided capacitive electrodes, with reference to FIGS. 3(a) and 3(b).

FIG. 3(a) is an enlarged plan view illustrating the clock signal wiring 104 and the power supply wiring 105 in the relevant part X in FIG. 1. FIG. 3(b) is a cross-sectional view taken along the line BB of FIG. 3(a).

FIG. 3(a) illustrates an example in which the capacitive electrode 109 illustrated in FIG. 2(a) is divided into three parts. In this example, the capacitive electrode 109 is divided into a divided capacitive electrode 109a, a divided capacitive electrode 109b, and a divided capacitive electrode 109c.

Each of the divided capacitive electrode 109a, the divided capacitive electrode 109b, and the divided capacitive electrode 109c is electrically connected to the clock signal wiring 104, via each of a divided connecting wiring 108a, a divided connecting wiring 108b, and a divided connecting wiring 108c.

In a case as illustrated in FIG. 3(b), the divided connecting wiring 108b and the divided capacitive electrode 109b are formed in the same layer as the clock signal wiring 104, as with the case of the configuration shown in FIG. 2(b). The divided connecting wiring 108a, the divided connecting wiring 108c, the divided capacitive electrode 109a, and the divided capacitive electrode 109c, all of which are not illustrated, are also formed in the same layer as the clock signal wiring 104.

Since the three electrodes, i.e., the divided capacitive electrode 109a, the divided capacitive electrode 109b, and the divided capacitive electrode 109c are formed so as to overlap with the projection plane of the power supply wiring 105, a divided capacitance 301a is formed between the power supply wiring 105 and the divided capacitive electrode 109a, a divided capacitance 301b is formed between the power supply wiring 105 and the divided capacitive electrode 109b, and a divided capacitance 301c is formed between the power supply wiring 105 and the divided capacitive electrode 109c. The three divided capacitances 301a through 301c constitute the capacitance 301 for modulating a waveform of the clock signal passing through the clock signal wiring 104. A capacitance value of the capacitance 301 in this case is the sum total of capacitance values of the three divided capacitances 301a through 301c.

In order that the three divided capacitances 301a through 301c constituting the capacitance 301 serve to modulate a waveform of a clock signal passing through the clock signal wiring 104, it is necessary for each of the divided capacitive electrodes 109a through 109c to be electrically connected to the clock signal wiring 104, via each of the divided connecting wirings 108a through 108c.

Therefore, by cutting any one of the divided connecting wiring 108a through 108c, it is possible to adjust a capacitance value of the capacitance 301 needed to modulate a waveform of the clock signal passing through the clock signal wiring 104.

In other words, by cutting, with the use of laser or the like, any one of the divided connecting wirings 108a through 108c which connect electrically the clock signal wiring 104 to each of the divided capacitive electrodes 109a through 109c, it is possible to adjust a capacitance value of the capacitance 301 for modulating a waveform of a clock signal passing through the clock signal wiring 104. An example, in which the divided connecting wiring 108c is referred to as a part Y, which is to be cut, will be explained with reference to FIG. 3(a). In this case, if the part Y is cut, then a capacitance value of the capacitance 301 for modulating a waveform of a clock signal passing through the clock signal wiring 104 will be the sum total of capacitance values of the divided capacitance 301a formed between the divided capacitive electrode 109a and the power supply wiring 105, and the divided capacitance 301b formed between the divided capacitive electrode 109b and the power supply wiring 105.

As described above, the capacitive electrode 109 is composed of the divided capacitive electrodes 109a through 109c, which are insulated from each other, and each of the divided capacitive electrodes 109a through 109c is connected to the same clock signal wiring 104 via each of the divided connecting wirings 108a through 108c.

According to the configuration, capacitances referred to as the divided capacitances 301a through 301c are independently formed between each of the divided capacitive electrodes 109a through 109c and the power supply wiring 105, since the divided capacitive electrodes 109a through 109c constituting the capacitive electrode 109 are insulated from each other. However, a capacitance used to modulate a waveform of a clock signal passing through the clock signal wiring 104 is the sum total of the divided capacitances 301a through 301c formed between each of the divided capacitive electrodes 109a through 109c and the power supply wiring 105. This is because each of the divided capacitive electrodes 109a through 109c is connected to the same clock signal wiring 104 via each of the divided connecting wiring 108a through 108c.

It is therefore possible to adjust a capacitance value of the capacitance used to modulate a waveform of a clock signal passing through the clock signal wiring 104 by cutting any one of the divided connecting wirings 108a through 108c, which electrically connect the divided capacitive electrodes 109a through 109c to the clock signal wiring 104.

The description above has been made, supposing a case where the capacitance 301 for modulating a waveform of a clock signal passing through the clock signal wiring 104 is composed of the three divided capacitances 301a through 301c, and a capacitance value of the capacitance 301 is the sum total of the capacitance values of the three divided capacitances 301a through 301c, since all of the divided capacitive electrode 109a, the divided capacitive electrode 109b, and the divided capacitive electrode 109c are (i) formed in the same layer as the clock signal wiring 104, and (ii) electrically connected to the clock signal wiring 104 via the divided connecting wirings 108a through 108c.

This means that a capacitance value of the capacitance 301 for modulating a waveform of a clock signal passing through the clock signal wiring 104 is determined in an initial condition. It is thus possible to decrease the capacitance value of the capacitance 301 by cutting any one of the divided connecting wirings 108a through 108c, as described above, but not to increase the capacitance value.

The following description will discuss a way for adjusting a capacitance value of the capacitance 301 so that the capacitance value of the capacitance 301 is increased.

Figure 4A:
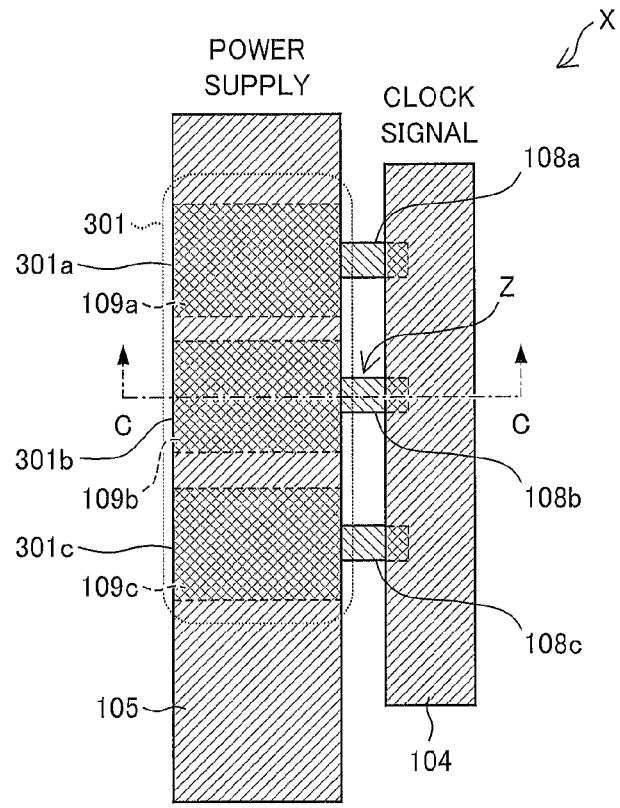
FIG. 4(a) is an enlarged view of the relevant part X illustrated in FIG. 1.
Figure 4B:
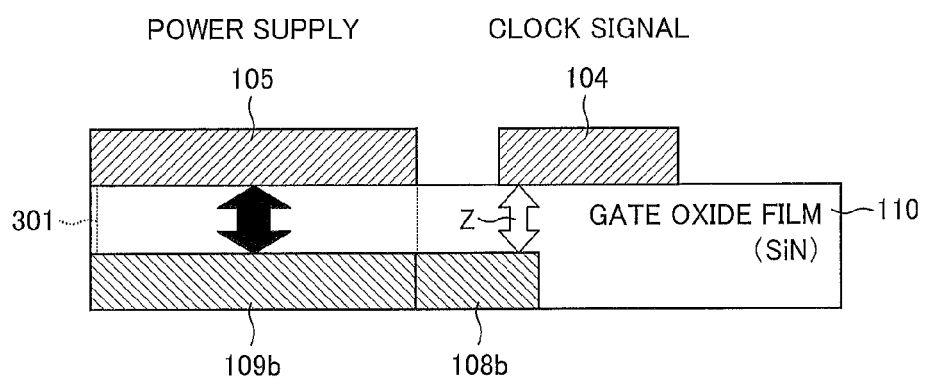
FIG. 4(b) is a cross-sectional view taken along the line CC of FIG. 4(a).

FIG. 4(a) is an enlarged plan view illustrating the clock signal wiring 104 and the power supply wiring 105 in the relevant part X of FIG. 1. FIG. 4(b) is a cross sectional view taken along the line CC of FIG. 4(a).

FIG. 4(a) illustrates an example in which the capacitive electrode 109 illustrated in FIG. 2(a) is divided into three parts, corresponding to the divided capacitive electrodes 109a through 109c as illustrated in FIG. 3(a).

In an initial condition, the divided connecting wirings 108a through 108c are respectively connected to the divided capacitive electrodes 109a through 109c, whereas none of the divided connecting wirings 108a through 108c is electrically connected to the clock signal wiring 104.

That is, the divided connecting wirings 108a through 108c and the divided capacitive electrodes 109a through 109c are formed in a layer different from a layer in which the clock signal wiring 104 is formed. As illustrated in FIG. 4(a), each of the divided connecting wirings 108a through 108c is configured, on a side opposite to a side where the divided connecting wirings 108a through 108c are respectively connected to the divided capacitive electrodes 109a through 109c, so as to overlap partially with a projection plane of the clock signal wiring 104.

For example, as illustrated in FIG. 4(b), the divided capacitive electrode 109b and the divided connecting wiring 108b are formed in a same layer, while the clock signal wiring 104 is formed in a same layer as the power supply wiring 105. And, the divided connecting wiring 108b is formed, on a side opposite to a side where the divided connecting wiring 108b is connected to the divided capacitive electrode 109b, so as to overlap partially with the projection plane of the clock signal wiring 104. Therefore, it is possible to weld such an overlapping part (a part Z, which is to be welded) to the clock signal wiring 104 with the use of a laser thereby electrically connecting the divided connecting wiring 108b to the clock signal wiring 104.

Therefore, in a case where the wiring configuration as illustrated in FIGS. 4(a) and 4(b), the capacitance value in an initial condition of the capacitance 301 for modulating a waveform of a clock signal passing through the clock signal wiring 104 is 0, since the divided capacitive electrodes 109a through 109c are not electrically connected to the clock signal wiring 104. In other words, it is possible to remain a clock signal passing through the clock signal wiring 104 without modulating a waveform of the clock signal.

In order to obtain, in an initial condition, a capacitance value required for the capacitance 301, the part Z, which is to be welded, of at least one wiring of the divided connecting wirings 108a through 108c can be welded with the use of a laser, as described above. This allows (i) at least one of the divided capacitive electrodes 109a through 109c to be electrically connected to the clock signal wiring 104 and (ii) at least one of the divided capacitances 301a through 301c to be formed. This leads to increase the capacitance value of the capacitance 301.

That is, in an initial condition where a plurality of the divided connecting wirings 108a through 108c are not connected to the clock signal wiring 104, it is possible to pass a clock signal, whose waveform is not modulated, through the clock signal wiring 104.

When a modulation of a waveform is required as described above, the configuration capable of performing the modulation can be prepared by welding at least one of the divided connecting wirings 108a through 108c to the clock signal wiring 104 in such a manner that a part of the at least one of the divided connecting wirings 108a through 108c, which part is on the clock signal wiring 104-side, is welded and electrically connected to the clock signal wiring 104, thereby allowing a capacitance to be formed. In this case, a capacitance value of the capacitance for modulating a waveform of the clock signal passing through the clock signal wiring 104 can be adjusted by adjusting the number of the divided connecting wirings 108a through 108c to be welded.

Embodiment 1 has described an example in which the power supply wiring 105 is used as a conductive film for forming capacitance with the capacitive electrode, which is a part of the input/output wiring. Note, however, that the present invention is not limited to such an example. The following Embodiment 2 will describe an example in which a light shielding film is used as a conductive film.

Embodiment 2

The following description will discuss Embodiment 2 in accordance with the present invention. The same reference numerals are given to the members same as those discussed in Embodiment 1 and their descriptions are omitted.

A display device in accordance with Embodiment 2 has the configuration same as that of the display device discussed in Embodiment 1, except for that the display device of Embodiment 2 has a different relation between the input/output signal wiring and the conductive film.

Figure 5A:
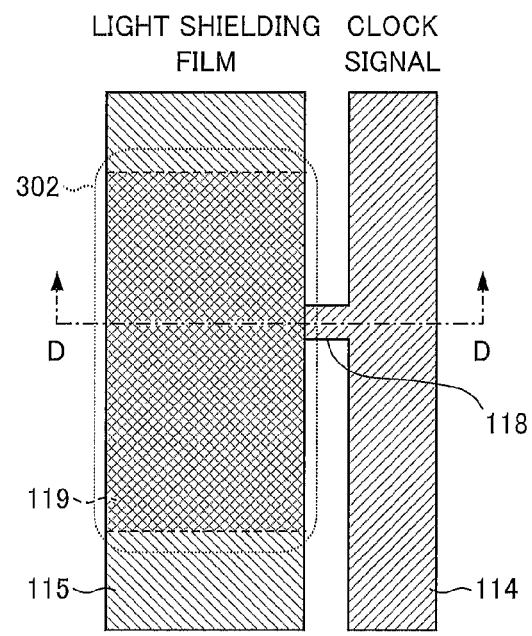
FIG. 5(a) is a plan view illustrating wirings for forming a capacitance, according to another embodiment of the present invention.
Figure 5B:
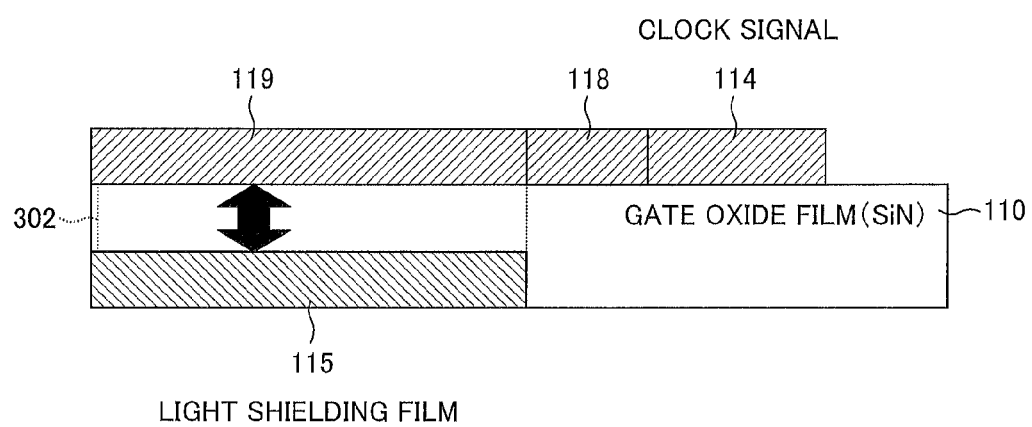
FIG. 5(b) is a cross-sectional view taken along the line DD of FIG. 5(a).

Embodiment 2 will describe, with reference to FIGS. 5(a) and 5(b), an example in which an input or output signal is defined as a clock signal, as with the case of Embodiment 1, and a conductive film is defined as a light shielding film 115, instead of the power supply wiring 105 of Embodiment 1. The light shielding film 115 is a light shielding film provided in a case where a display panel 1 is a liquid crystal display panel.

FIG. 5(a) is an enlarged plan view illustrating a clock signal wiring 114 and the light shielding film 115. FIG. 5(b) is a cross sectional view taken along the line DD of FIG. 5(a).

As illustrated in FIG. 5(b), the light shielding film 115 is a layer different from the clock signal wiring 114 and provided in a same layer as the source signal wiring formed in the pixel region 102.

On the light shielding film 115, a gate oxide film 110 is provided, and a clock signal wiring 114, a connecting wiring 118, and a capacitive electrode 119 are formed on the gate oxide film 110. That is, the clock signal wiring 114 is electrically connected to the capacitive electrode 119 formed on the light shielding film 115-side, via the connecting wiring 118, the connecting wiring 118 and the capacitive electrode 119 being provided in the same layer as the clock signal wiring 114. The clock signal wiring 114 is provided in the same layer as the source signal wiring formed in the pixel region 102.

As illustrated in FIGS. 5(a) and 5(b), the capacitive electrode 119 is formed so as to overlap with a projection plane of the light shielding film 115. This leads to form a capacitance 302 between the capacitive electrode 119 and the light shielding film 115.

The light shielding film 115 serving as a conductive film is a part of a light shielding film formed in the display panel 1, so that the light shielding film can be produced in the same step for producing the conductive film. This can eliminate the need to perform a separate process for producing the light shielding film 115 serving as the conductive film, and thus prevent manufacturing cost for forming a capacitance from increasing.

The light shielding film 115 does not have a particular disadvantage because the light shielding film 115 can form the capacitance 302 even if the light shielding film 115 has an open potential, i.e., the light shielding film 115 is not connected to a power line. However, if the light shielding film 115 is connected to a power line, then the light shielding film 115 allows stabilizing a capacitance value of the capacitance 302 thus formed.

That is, the light shielding film 115 can stabilize a capacitance value of the capacitance 302 by being connected to the power line (not illustrated). As a result, it is possible to surely obtain a capacitance 302 having a capacitance value desired by a manufacturer of the display panel 1.

Embodiment 2 has described an example, in which the light shielding film 115 is used as a conductive film. In contrast, the following Embodiment 3 will describe an example, in which an ITO film is used as a conductive film.

Embodiment 3

The following description will discuss Embodiment 3 in accordance with the present invention. The same reference numerals are given to the members same as those discussed in Embodiment 1 and their descriptions are omitted A display device in accordance with Embodiment 3 has the configuration same as that of the display device discussed in Embodiment 1, except that the display device of Embodiment 3 has a different relation between the input/output signal wiring and the conductive film.

Figure 6A:
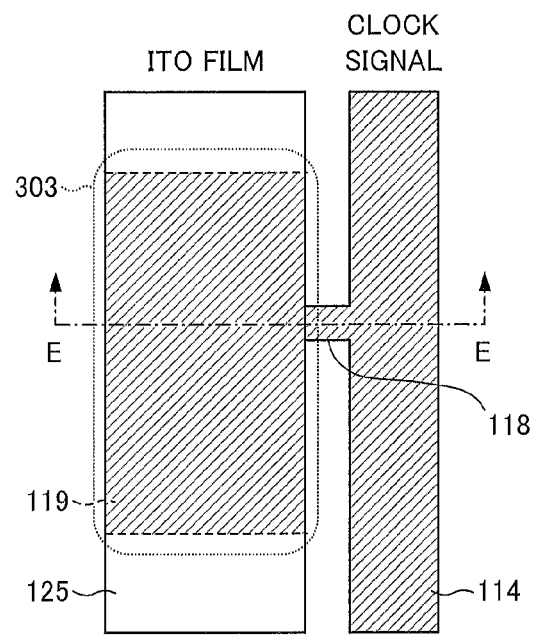
FIG. 6(a) is a plan view of wirings for forming a capacitance, according to yet another embodiment of the present invention.
Figure 6B:
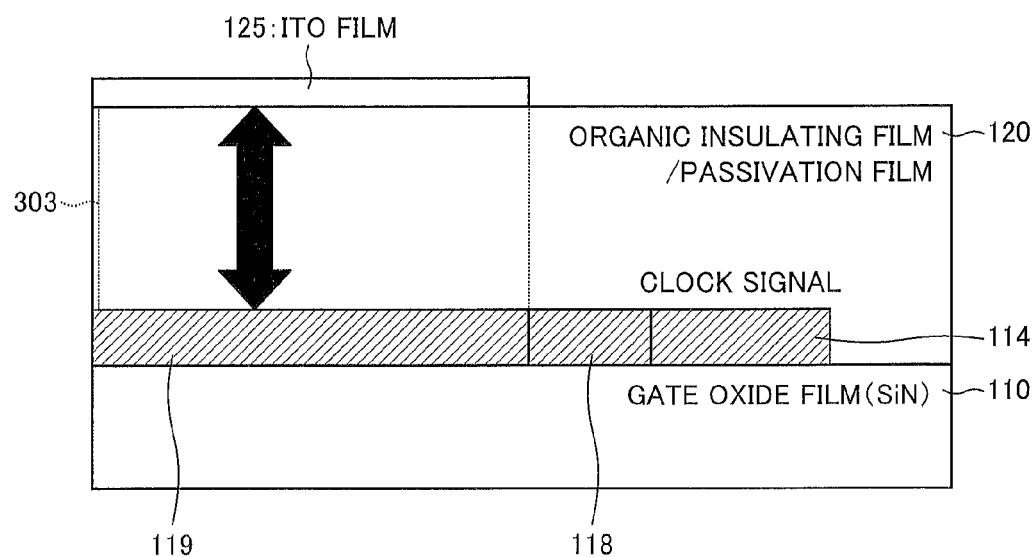
FIG. 6(b) is a cross-sectional view taken along the line EE of FIG. 6(a).

Embodiment 3 will describe, with reference to FIGS. 6(a) and 6(b), an example in which an input or output signal is defined as a clock signal, as with the case of Embodiment 2, and a conductive film is defined as an ITO film 125, instead of the light shielding film 115 of Embodiment 2. The ITO film 125 is an ITO film, which is a transparent electrode used as pixels constituting the display panel 1.

FIG. 6(a) is an enlarged plan view illustrating the clock signal wiring 114 and the ITO film 125. FIG. 6(b) is a cross sectional view taken along the line EE of FIG. 6(a).

As illustrated in FIG. 6(a), the clock signal wiring 114 is electrically connected, via the connecting wiring 118, to the capacitive electrode 119 formed on the ITO film 125-side, as with the case of Embodiment 2.

As illustrated in FIG. 6(b), the clock signal wiring 114, the connecting wiring 118, and the capacitive electrode 119 are formed in a same layer on a gate oxide film 110. The ITO film 125 is formed so as to sandwich an organic insulating film/passivation film 120 with the clock signal wiring 114, the connecting wiring 118, and the capacitive electrode 119.

The ITO film 125 is formed at a position where the ITO film 125 does not overlap with a projection plane of the clock signal wiring 114 but with a projection plane of the capacitive electrode 119.

According to such a configuration, a capacitance 303 is formed between the ITO film 125 and the capacitive electrode 119.

The ITO film 125 is a part of a transparent conductive film forming pixels that the display panel 1 has, so that the ITO film 125 can be produced in the same step for producing the transparent conductive film. This can eliminate the need to perform a separate process for producing the ITO film 125 and thus prevent a manufacturing cost for forming a capacitance from increasing.

Note, however, that, since the ITO film 125 has an open potential, i.e., the ITO film 125 is not connected to a power line, a capacitance value of the capacitance 303 may be unstable.

However, it is possible to stabilize a capacitance value of the capacitance 303 by stabilizing the potential of the ITO film 125. The following will discuss a particular configuration for this purpose, with reference to FIG. 7(a) and FIG. 7(b).

The following description will be made on the premise that a display device is a liquid crystal display device.

Figure 7A:
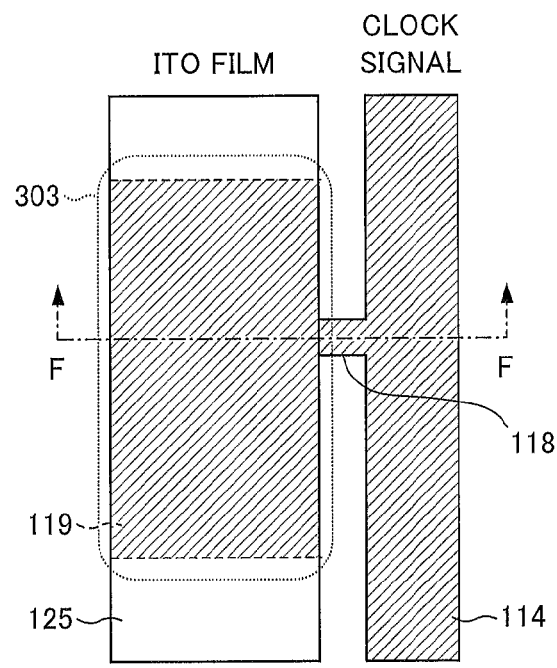
FIG. 7(a) is a plan view of wirings for forming a capacitance, according to yet another embodiment of the present invention.
Figure 7B:
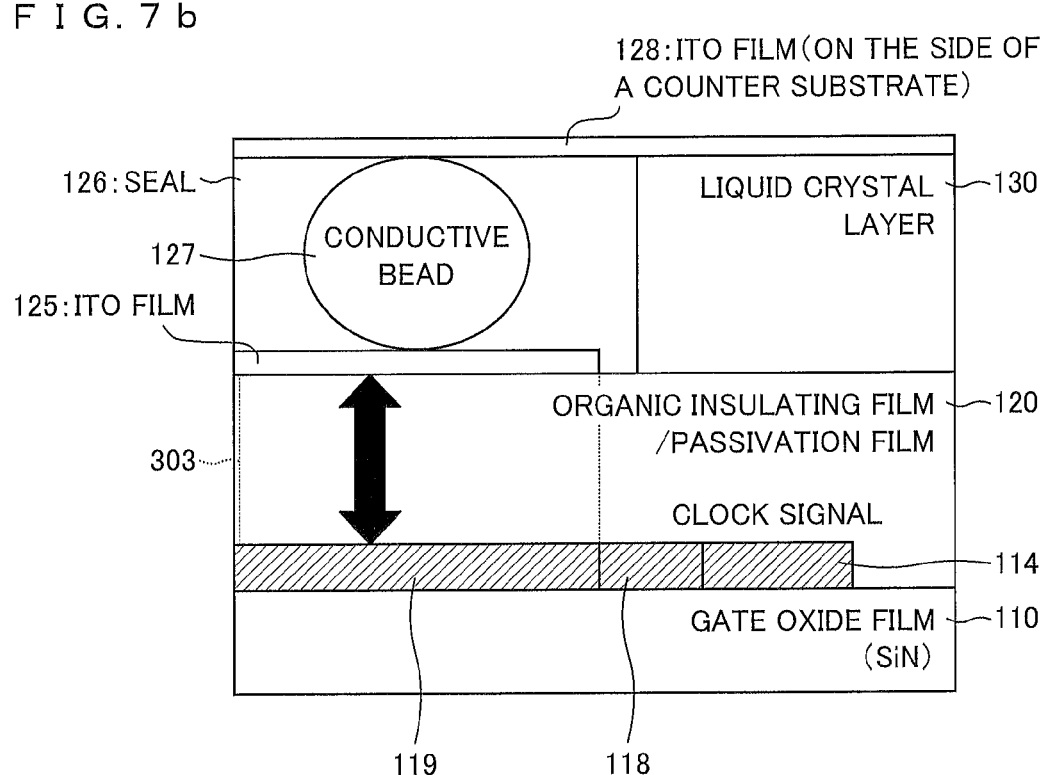
FIG. 7(b) is a cross-sectional view taken along the line FF of FIG. 7(a).

FIG. 7(a) is an enlarged plan view illustrating the clock signal wiring 114 and the ITO film 125. FIG. 7(b) is a cross sectional view taken along the line FF of FIG. 7(a).

The configuration of FIG. 7(a) and FIG. 7(b) indicating a relation between the clock signal wiring 114 and the ITO film 125 is equivalent to that of FIGS. 6(a) and 6(b) indicating a relation between the clock signal wiring 114 and the ITO film 125, except that, as illustrated in FIG. 7(b), a liquid crystal layer 130, and members associated therewith, i.e., a seal 126, a conductive bead 127, and an ITO film 128 are provided on the organic insulating film/passivation film 120.

On the ITO film 125, the conductive bead 127 is disposed so as to be electrically connected to and in contact with the ITO film 128 formed on a counter substrate (not illustrated). This makes it possible for the ITO film 125 to be electrically connected to the ITO film 128 via the conductive bead 127, so that a potential, which corresponds to the potential of the ITO of the counter substrate, can be maintained.

It is thus possible to stabilize a capacitance value of the capacitance 303 formed between the ITO film 125 and the capacitive electrode 119.

In a case where the display device of Embodiment 3 includes a liquid crystal display panel and drivers (the gate driver circuit 103 and the source driver circuit 107 (see, for example, FIG. 1)) for driving the liquid crystal display panel, the ITO film 125 is provided on the side of a pixel electrode substrate (not illustrated) of the liquid crystal display panel and is electrically connected to the ITO film 128, that is a counter electrode provided on the counter substrate (not illustrated) facing the pixel electrode substrate, via the conductive bead 127, that is a conductive member.

According to the configuration, a capacitance value of the capacitance 303 can be stabilized since the ITO film 125, which serves as one of the electrodes for forming the capacitance 303, is electrically connected, via the conductive bead 127, to the ITO film 128, that is a counter electrode provided on the counter substrate facing the pixel electrode substrate of the liquid crystal display panel.

It is therefore possible to surely obtain a capacitance having a capacitance value desired by a manufacturer of the display device.

The clock signal wiring 114 is a clock signal wiring for supplying the drivers (the gate driver circuit 103 and the source driver circuit 107) with a clock.

Therefore, it is possible to adjust a waveform of a clock signal passing through the clock signal wiring 114. This makes it possible to evaluate the operational performance of the drivers (the gate driver circuit 103 and the source driver circuit 107).

Embodiments 1 through 3 have described examples in which the input or output signal is a clock signal to be inputted into the circuits (the drivers). In contrast, the following Embodiment 4 will describe an example in which the input or output signal is an output signal to be outputted from the circuits (the drivers).

Embodiment 4

The following description will discuss Embodiment 4 in accordance with the present invention. The same reference numerals are given to the members same as those discussed in Embodiment 3 and their descriptions are omitted.

A display device in accordance with Embodiment 4 has the configuration same as that of the display device illustrated in FIGS. 7(a) and 7(b) of Embodiment 3, except that a clock signal, which is a type of an input or output signal of Embodiment 3, is replaced with an output signal.

Figure 8A:
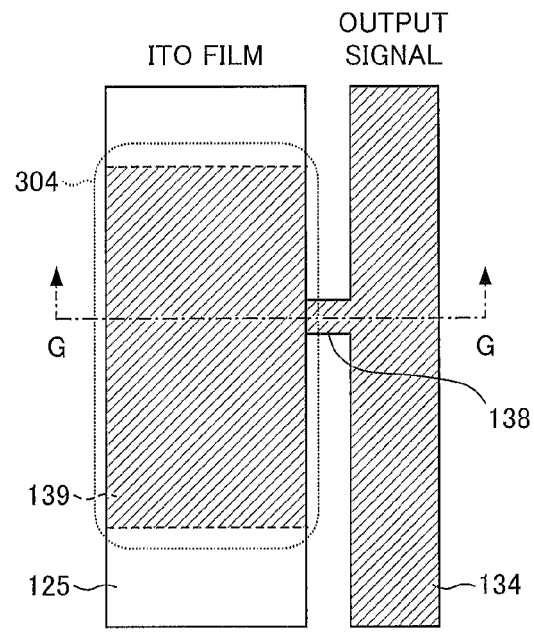
FIG. 8(a) is a plan view of wirings for forming a capacitance, according to yet another embodiment of the present invention.
Figure 8B:
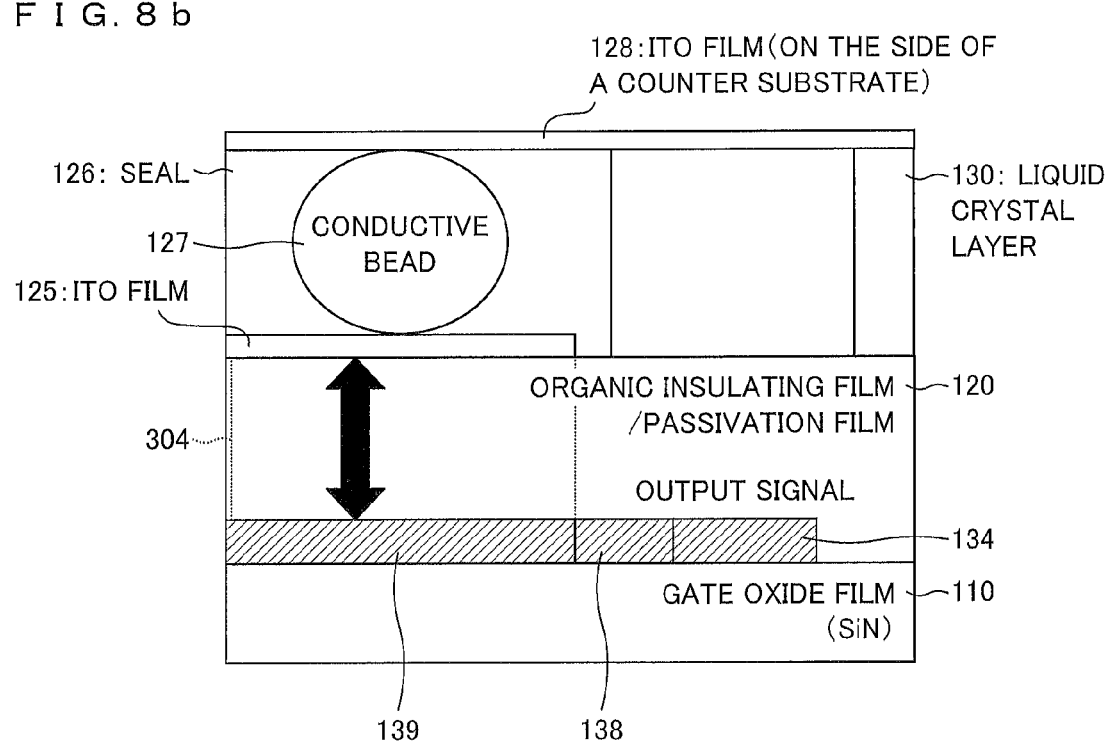
FIG. 8(b) is a cross-sectional view taken along the line GG of FIG. 8(a).
Figure 9:
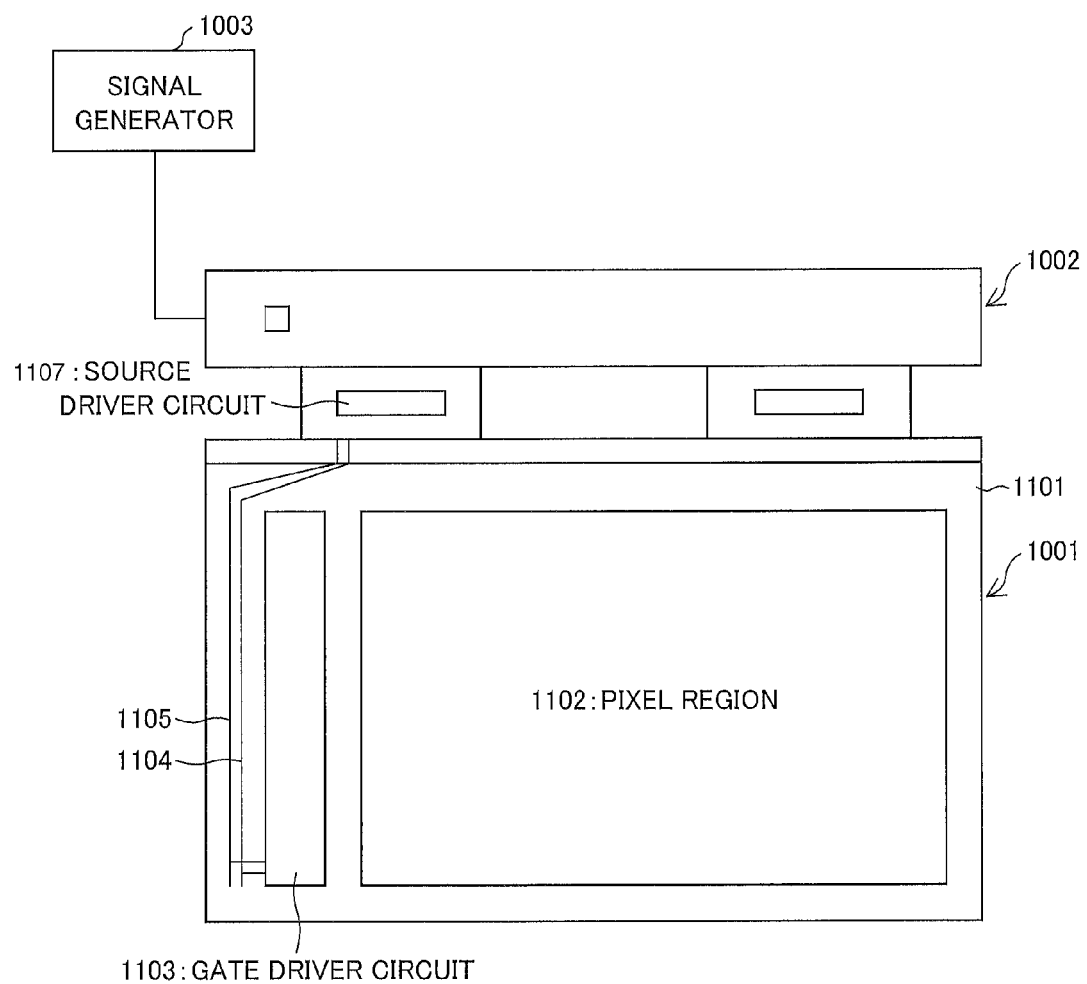
FIG. 9 is a block diagram illustrating a schematic configuration of a conventional display device.
Figure 10A:
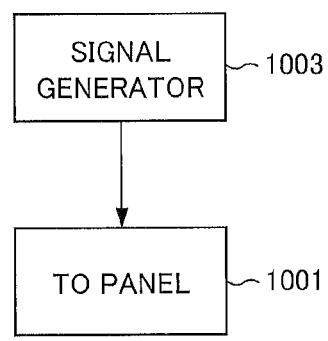
FIG. 10(a) is an equivalent circuit diagram in a case where a signal generator is used.
Figure 10B:
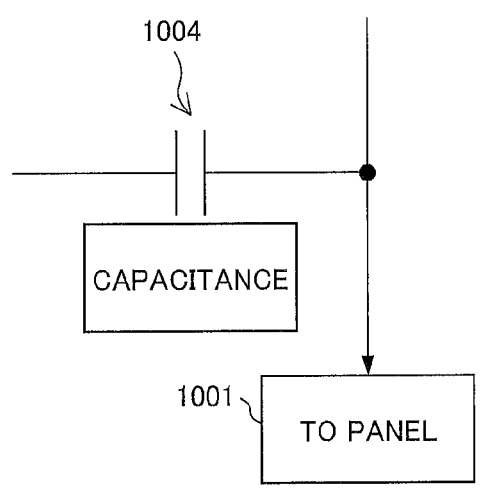
FIG. 10(b) is an equivalent circuit diagram in a case where a capacitance is additionally provided to a control substrate.

FIG. 8(a) is an enlarged plan view illustrating an output signal wiring 134 and the ITO film 125. FIG. 8(b) is a cross sectional view taken along the line GG of FIG. 8(a).

As illustrated in FIG. 8(a), the output signal wiring 134 is electrically connected, via a connecting wiring 138, to a capacitive electrode 139 formed on the ITO film 125-side, as with the case of Embodiment 3.

As illustrated in FIG. 8(b), the output signal wiring 134, the connecting wiring 138, and the capacitive electrode 139 are formed in a same layer on the gate oxide film 110, and the ITO film 125 is formed so as to sandwich the organic insulating film/passivation film 120 with the output signal wiring 134, the connecting wiring 138, and the capacitive electrode 139.

The output signal wiring 134 is formed in the same layer as the source signal wiring of the pixel region 102 so that a signal outputted from the source driver circuit 107 (a source signal) is passed through. That is, in Embodiment 4, a waveform of the output signal passing through the output signal wiring 134 is modulated.

The capacitive electrode 139 is provided so as to overlap with a projection plane of the ITO film 125, so that a capacitance 304 is formed between the ITO film 125 and the capacitive electrode 139. This allows a waveform of the output signal passing through the output signal wiring 134 to be modulated in accordance with the capacitance value of the capacitance 304.

On the ITO film 125, the conductive bead 127 is disposed so as to be electrically connected to and in contact with the ITO film 128 formed on a counter substrate (not illustrated). Accordingly, the ITO film 125 can be electrically connected to the ITO film 128 via the conductive bead 127, so that it is possible to maintain a constant potential.

It is thus possible to stabilize a capacitance value of the capacitance 304 formed between the ITO film 125 and the capacitive electrode 139.

Modulating a waveform of the output signal, as described above, allows inspecting a margin of the output signal.

It is thus possible to observe how the display state in a pixel region of the display panel 1 varies, since a waveform of the output signal passing through the output signal wiring 134 can be modulated. In other words, it is possible to evaluate the display state of the display panel 1.

As an example of modulating a waveform of the output signal, outputs of nodes in a shift register constituting the gate driver circuit 103 or the like may be defined as output signals and waveforms of the output signals may be modulated. In this case, an operating state of the shift register can be observed.

The present invention is not limited to the embodiments described above, and may be varied within the scope of the patent claims. Namely, other embodiments obtained by appropriately incorporating technical means disclosed in a variety of embodiments are included in the technical scope of the present invention.

INDUSTRIAL APPLICABILITY

The present invention is applicable to a general electronic apparatus in which an input or output signal is modulated, such as a liquid crystal display device, an organic EL (electro luminescence) display device, and a plasma display device.

REFERENCE SIGNS LIST

1 Display panel
2 Control substrate
101 Insulating substrate
102 Pixel region
103 Gate driver circuit
104 Clock signal wiring
105 Power supply wiring
106 Connecting terminal
107 Source driver circuit
108 Connecting wiring
108a through 108c Divided connecting wirings
109 Capacitive electrode
109a through 109c Divided capacitive electrodes
110 Gate oxide film
114 Clock signal wiring
115 Light shielding film
118 Connecting wiring
119 Capacitive electrode
120 Organic insulating film/passivation film
125 ITO film
126 Seal
127 Conductive bead
128 ITO film
130 Liquid crystal layer
134 Output signal wiring
138 Connecting wiring
139 Capacitive electrode
201 Level shifter
202 Control IC
203 ROM
301 Capacitance
301a through 301c Divided capacitances
302 Capacitance
303 Capacitance
304 Capacitance
VDD Power
VSS Power
X Relevant part
Y Part to be cut
Z Part to be welded

The invention claimed is:

1. An electronic apparatus having an integrated electronic circuit, comprising:
   an input/output signal wiring for inputting or outputting a signal to or from the electronic circuit;
   a conductive film formed at a position where the conductive film does not overlap with a projection plane of the input/output signal wiring, so as to sandwich at least an insulating layer with a layer in which the input/output signal wiring is formed; and
   a capacitive electrode electrically connected to the input/output signal wiring,
   the capacitive electrode being formed so as to overlap at least partially with a projection plane of the conductive film.

2. The electronic apparatus as set forth in claim 1, wherein:
   the capacitive electrode is formed so that an entire electrode surface of the capacitive electrode is located within the projection plane of the conductive film.

3. The electronic apparatus as set forth in claim 1, wherein:
   the capacitive electrode is formed in a same layer as the input/output signal wiring.

4. The electronic apparatus as set forth in claim 1, wherein:
   the capacitive electrode is composed of a plurality of divided capacitive electrodes insulated from each other, each of the divided capacitive electrodes constituting the same capacitive electrode being connected to the same input/output signal wiring via each connecting wiring.

5. The electronic apparatus as set forth in claim 1, wherein:
   the conductive film is a power supply wiring for supplying the electronic circuit with power.

6. The electronic apparatus as set forth in claim 1, wherein:
   the conductive film is a part of a light shielding film formed in the electronic circuit.

7. The electronic apparatus as set forth in claim 6, wherein:
   the light shielding film is connected to the power supply wiring for supplying the electronic circuit with power.

8. The electronic apparatus as set forth in claim 1, wherein:
   the conductive film is a part of a transparent conductive film for forming pixels of the electronic circuit.

9. The electronic apparatus as set forth in claim 8, wherein:
   the transparent conductive film is connected to the power supply wiring for supplying the electronic circuit with power.

10. The electronic apparatus as set forth in claim 8, wherein:
    the transparent conductive film is provided on a liquid crystal display panel including a pixel electrode substrate and a counter substrate facing the pixel electrode substrate, the transparent conductive film being provided on the pixel electrode substrate and being electrically connected to a counter electrode provided on the counter substrate via a conductive member.

11. The electronic apparatus as set forth in claim 1, wherein:
    the input/output signal wiring is a clock signal wiring for supplying the electronic circuit with a clock.

12. The electronic apparatus as set forth in claim 1, wherein:
    the input/output signal wiring is an output signal wiring for outputting an output signal from the electronic circuit to the liquid crystal display panel.

13. An electronic apparatus having an integrated electronic circuit, comprising:
    an input/output signal wiring for inputting or outputting a signal to or from the electronic circuit;
    a conductive film formed at a position where the conductive film does not overlap with a projection plane of the input/output signal wiring, so as to sandwich at least an insulating layer with a layer in which the input/output signal wiring is formed; and
    a capacitive electrode formed so as to sandwich the insulating layer with the conductive film,
    the capacitive electrode being composed of a plurality of divided capacitive electrodes insulated from each other,
    each of the plurality of divided capacitive electrodes being connected, via the input/output signal wiring and the insulating layer, to each connecting wiring formed in a different layer,
    the each connecting wiring being formed so that a part of a projection plane of the connecting wiring overlaps with the projection plane of the input/output signal wiring.

14. A display panel in which a gate driver circuit is formed on an insulating substrate, comprising:
    a clock signal wiring for inputting or outputting a signal to or from the gate driver circuit;
    a power supply wiring formed at a position where the power supply wiring does not overlap with a projection plane of the clock signal wiring, so as to sandwich at least an insulating layer with a layer in which the clock signal wiring is formed; and
    a capacitive electrode electrically connected to the clock signal wiring,
    the capacitive electrode being formed so as to overlap at least partially with a projection plane of the power supply wiring.

* * * * *